US008626226B2

(12) United States Patent
Catreux-Erceg et al.

(10) Patent No.: US 8,626,226 B2
(45) Date of Patent: *Jan. 7, 2014

(54) METHOD AND SYSTEM FOR DETERMINING SYNCHRONIZATION STATUS IN A WIDE BAND CDMA NETWORK

(75) Inventors: Severine Catreux-Erceg, Cardiff, CA (US); Mark Kent, Vista, CA (US); Uri M Landau, San Diego, CA (US); Vinko Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 12/897,972

(22) Filed: Oct. 5, 2010

(65) Prior Publication Data

US 2011/0019727 A1 Jan. 27, 2011

Related U.S. Application Data

(63) Continuation of application No. 11/355,222, filed on Feb. 15, 2006, now Pat. No. 7,809,395.

(51) Int. Cl.
*H04B 7/00* (2006.01)
*H04B 1/00* (2006.01)

(52) U.S. Cl.
USPC ........................... 455/522; 455/69; 455/127.1

(58) Field of Classification Search
USPC ........................................ 455/522, 69, 127.1
See application file for complete search history.

(56) References Cited

U.S. PATENT DOCUMENTS

| 6,269,239 | B1 * | 7/2001 | Hashem et al. | 455/69 |
| 6,343,218 | B1 | 1/2002 | Kaneda et al. | |
| 6,633,552 | B1 * | 10/2003 | Ling et al. | 370/318 |
| 6,914,932 | B1 * | 7/2005 | Miya et al. | 375/150 |
| 6,983,166 | B2 | 1/2006 | Shiu et al. | |

(Continued)

FOREIGN PATENT DOCUMENTS

| EP | 1317078 B1 | 6/2003 |
| EP | 1 179 892 B1 | 4/2005 |

(Continued)

OTHER PUBLICATIONS

Extended European Search Report corresponding to European Patent Application Serial No. 08017040.0-2411, Munich, Germany, mailed on Dec. 16, 2008.

(Continued)

*Primary Examiner* — Tilahun B Gesesse
(74) *Attorney, Agent, or Firm* — Sterne, Kessler, Goldstein & Fox P.L.L.C.

(57) ABSTRACT

A method and system for determining synchronization status in a wide band CDMA (WCDMA) network may comprise calculating a signal to noise ratio (SNR) of a downlink dedicated physical channel (DPCH) based on a plurality of transmit power control (TPC) bits received via the downlink dedicated physical channel (DPCH), wherein the value of at least one of the plurality of TPC bits is not known when at least one of the plurality of TPC bits is received. The transmit circuitry may be controlled based on the calculated signal to noise ratio. The transmit circuitry may be disabled if the calculated SNR of the plurality of TPC bits is below a first channel threshold. The transmit circuitry may be enabled if the calculated SNR of the plurality of TPC bits is above a second channel threshold.

24 Claims, 6 Drawing Sheets

(56) References Cited

U.S. PATENT DOCUMENTS

| | | | |
|---|---|---|---|
| 7,069,033 B1 | 6/2006 | Moon et al. | |
| 7,085,254 B1* | 8/2006 | Yun et al. | 370/342 |
| 7,146,142 B1* | 12/2006 | Raaf | 455/245.1 |
| 7,248,837 B2* | 7/2007 | Woo | 455/69 |
| 7,336,733 B2* | 2/2008 | Naito | 375/340 |
| 7,356,071 B2* | 4/2008 | Li et al. | 375/147 |
| 7,484,136 B2* | 1/2009 | Qiu | 714/704 |
| 7,532,664 B2 | 5/2009 | Rimini et al. | |
| 7,570,967 B2* | 8/2009 | Ronkainen | 455/522 |
| 7,706,827 B2 | 4/2010 | Catreux-Erceg et al. | |
| 7,730,381 B2 | 6/2010 | Butala et al. | |
| 7,809,395 B2 | 10/2010 | Catreux-Erceg et al. | |
| 7,894,507 B2 | 2/2011 | Kent et al. | |
| 7,907,961 B2 | 3/2011 | Catreux-Erceg et al. | |
| 7,929,473 B2 | 4/2011 | Willenegger et al. | |
| 2002/0085522 A1 | 7/2002 | Huber | |
| 2002/0157101 A1 | 10/2002 | Schrader et al. | |
| 2003/0125040 A1* | 7/2003 | Walton et al. | 455/454 |
| 2004/0166884 A1* | 8/2004 | Oh et al. | 455/522 |
| 2004/0264604 A1* | 12/2004 | Malette et al. | 375/340 |
| 2005/0152279 A1 | 7/2005 | Robertson et al. | |
| 2006/0251152 A1* | 11/2006 | Li et al. | 375/147 |
| 2007/0191045 A1 | 8/2007 | Kent et al. | |
| 2007/0191046 A1 | 8/2007 | Catreux-Erceg et al. | |
| 2010/0265840 A1 | 10/2010 | Catreux-Erceg et al. | |
| 2011/0164523 A1 | 7/2011 | Catreux-Erceg et al. | |

FOREIGN PATENT DOCUMENTS

| | | |
|---|---|---|
| EP | 1 821 423 A1 | 8/2007 |
| KR | 20000056189 A | 9/2000 |
| WO | WO00/74291 A1 | 12/2000 |
| WO | 2005002083 B1 | 1/2005 |

OTHER PUBLICATIONS

Office Action mailed Oct. 22, 2008, in U.S. Appl. No. 11/355,110, Catreux-Erceg et al., filed Feb. 15, 2006.

Office Action mailed May 28, 2009, in U.S. Appl. No. 11/355,110, Catreux-Erceg et al., filed Feb. 15, 2006.

Office Action mailed Nov. 30, 2009, in U.S. Appl. No. 11/355,110, Catreux-Erceg et al., filed Feb. 15, 2006.

Office Action mailed Oct. 22, 2009, in U.S. Appl. No. 11/355,222 Catreux-Erceg et al., filed Feb. 15, 2006 (now US Pat. No. 7,809,395).

Office Action mailed Mar. 23, 2009, in U.S. Appl. No. 11/355,222, Catreux-Erceg et al., filed Feb. 15, 2006 (now US Pat. No. 7,809,395).

Office Action mailed Dec. 1, 2009, in U.S. Appl. No. 11/355,222, Catreux-Erceg et al., filed Feb. 15, 2006 (now US Pat. No. 7,809,395).

Notice of Allowance mailed May 17, 2010, in U.S. Appl. No. 11/355,222, Catreux-Erceg et al., filed Feb. 15, 2006 (now US Pat. No. 7,809,395).

Office Action mailed Mar. 20, 2009, in U.S. Appl. No. 11/422,689, Catreux-Erceg et al., filed Jun. 7, 2006 (now US Pat. No. 7,907,961).

Notice of Allowance mailed Oct. 21, 2009, in U.S. Appl. No. 11/422,689, Catreux-Erceg et al., filed Jun. 7, 2006 (now US Pat. No. 7,907,961).

Office Action mailed Apr. 1, 2010, in U.S. Appl. No. 11/422,689, Catreux-Erceg et al., filed Jun. 7, 2006 (now US Pat. No. 7,907,961).

Notice of Allowance mailed Jun. 14, 2010, in U.S. Appl. No. 11/422,689, Catreux-Erceg et al., filed Jun. 7, 2006 (now US Pat. No. 7,907,961).

Office Action mailed Jun. 29, 2012, in U.S. Appl. No. 12/756,332, Catreux-Erceg et al., filed Apr. 8, 2010.

Final Rejection mailed Nov. 6, 2012 for U.S. Appl. No. 12/756,332, filed Apr. 8, 2010; 7 pages.

Non-Final Rejection mailed Apr. 4, 2013 for U.S. Appl. No. 12/756,332, filed Apr. 8, 2010; 8 pages.

Notice of Allowance mailed Jul. 18, 2013 for U.S. Appl. No. 12/756,332, filed Apr. 8, 2010; 8 pages.

Non-Final Rejection mailed Feb. 21, 2013 for U.S. Appl. No. 13/048,288, filed Mar. 15, 2011; 6 pages.

Final Rejection mailed Sep. 11, 2013 for U.S. Appl. No. 13/048,288, filed Mar. 15, 2011; 11 pages.

Patent Trial and Appeal Board Decision mailed Oct. 31, 2013, for U.S. Appl. No. 11/355,110, filed Feb. 15, 2006; 6 pages.

\* cited by examiner

METHOD AND SYSTEM FOR DETERMINING SYNCHRONIZATION STATUS IN A WIDE BAND CDMA NETWORK

CROSS-REFERENCE TO RELATED APPLICATIONS/INCORPORATION BY REFERENCE

This patent application is a continuation U.S. patent application Ser. No. 11/355,222 filed on Feb. 15, 2006, now U.S. Pat. No. 7,809,395.

This application also makes reference to U.S. patent application Ser. No. 11/355,110 filed on Feb. 15, 2006; U.S. patent application Ser. No. 11/355,109 filed on Feb. 15, 2006, now abandoned; U.S. patent application Ser. No. 11/355,111 filed on Feb. 15, 2006, now U.S. Pat. No. 7,706,827; and U.S. patent application Ser. No. 11/173,871 filed on Jun. 30, 2005, now U.S. Pat. No. 7,894,507.

Each of the above referenced applications is hereby incorporated herein by reference in its entirety.

FIELD OF THE INVENTION

Certain embodiments of the invention relate to wireless communication. More specifically, certain embodiments of the invention relate to a method and system for determining synchronization status in a wide band CDMA (WCDMA) network.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The universal mobile telecommunications system (UMTS) is an adaptation of a 3G system, which is designed to offer integrated voice, multimedia, and Internet access services to portable user equipment. The UMTS adapts wideband CDMA (WCDMA) to support data transfer rates, which may be as high as 2 Mbits/s. One of the reasons reason for WCDMA to support higher data rates is that WCDMA channels may have a bandwidth of 5 MHz versus the 200 kHz channel bandwidth in GSM.

In the case of a WCDMA downlink, multiple access interference (MAI) may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths after despreading, causing MAI. The level of intra-cell interference depends strongly on the channel response. In nearly flat fading channels, the physical channels remain almost completely orthogonal and intra-cell interference does not have any significant impact on the receiver performance. Frequency selectivity is common for the channels in WCDMA networks.

Mobile networks allow users to access services while on the move, thereby giving end users freedom in terms of mobility. However, this freedom does bring uncertainties to mobile systems. The mobility of the end users causes dynamic variations both in the link quality and the interference level, sometimes requiring that a particular user change its serving base station. This process is known as handover (HO). Handover is the essential component for dealing with the mobility of end users. It guarantees the continuity of the wireless services when the mobile user moves across cellular boundaries.

WCDMA networks may allow a mobile handset to communicate with a multiple number of cell sites. This may take place, for example, for a soft-handoff from one cell site to another. Soft-handoffs may involve cell sites that use the same frequency bandwidth. On occasions, there may be handoffs from one cell site to another where the two cell sites use different frequencies. In these cases, the mobile handset may need to tune to the frequency of the new cell site. Additional circuitry may be required to handle communication over a second frequency of the second cell site while still using the first frequency for communicating with the first cell site. The additional circuitry may be an undesirable extra cost for the mobile handset.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for determining synchronization status in a WCDMA network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
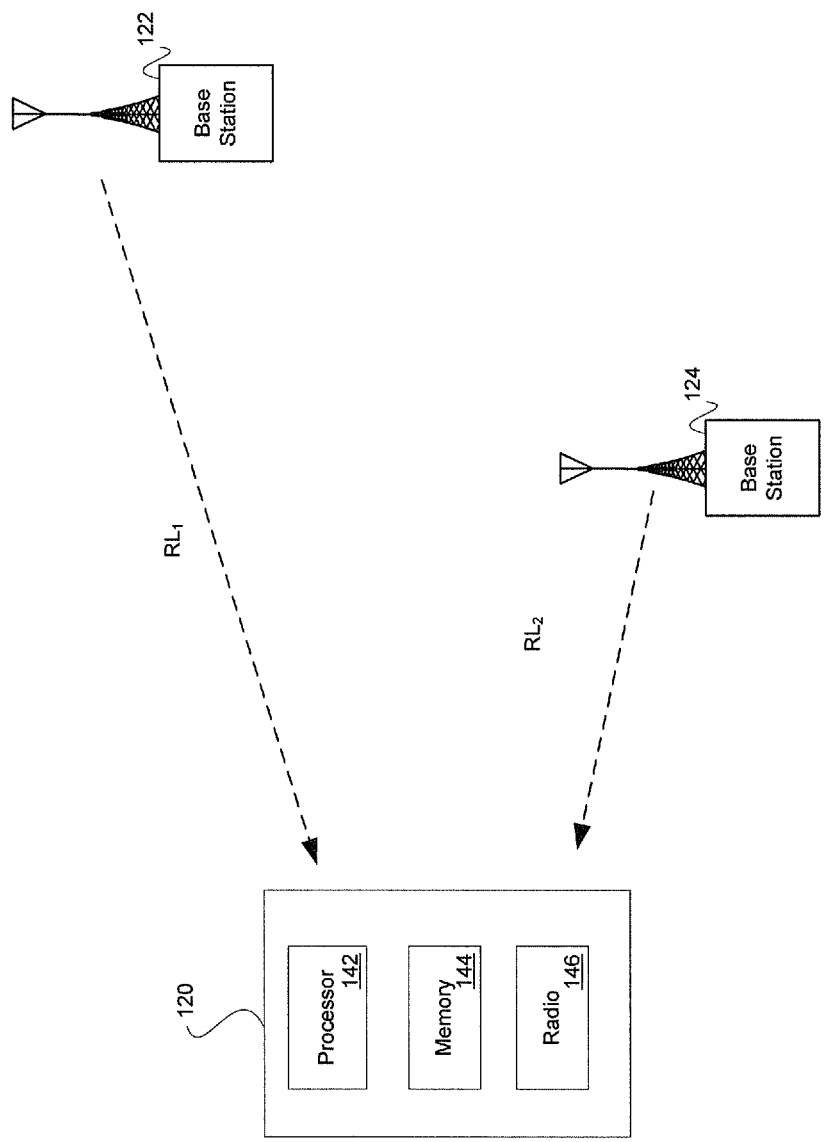
FIG. 1A is an exemplary diagram illustrating a WCDMA handset communicating with two WCDMA base stations, in accordance with an embodiment of the invention.

A method and system for determining synchronization status in a WCDMA network may comprise calculating a signal to noise ratio (SNR) of a downlink dedicated physical channel (DPCH) based on a plurality of transmit power control (TPC) bits received via the downlink dedicated physical channel (DPCH), wherein the value of at least one of the plurality of TPC bits is not known when at least one of the plurality of TPC bits is received. The uplink transmit circuitry may be controlled based on the calculated signal to noise ratio. The transmit circuitry may be disabled if the calculated SNR of the plurality of TPC bits is below a first channel threshold. The transmit circuitry may be enabled if the calculated SNR of the plurality of TPC bits is above a second channel threshold.

Due to the difficulties faced when non-linear channel equalizers are applied to the WCDMA downlink, detection of the desired physical channel with a non-linear equalizer may require implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission (DTX). This makes an accurate estimation of the constellation very difficult.

Uplink power control (PC) is of paramount importance for CDMA-based systems because the capacity of such a system is a function of the interference level. The power transmitted by all active user equipments (UE) within a network may be controlled to limit interference levels and alleviate well-known problems such as the "near-far" effect. If there is more than one user active, the transmitted power of non-reference users is suppressed by a factor dependent on the partial cross-correlation between the code of the reference user and the code of the non-reference user. However, when a non-reference user is closer to the receiver than the reference user, it is possible that the interference caused by this non-reference user has more power than the reference user also referred to as the "near-far" effect.

There are two types of power-control techniques. Open-loop power-control where each user equipment measures its received signal power and adjusts its transmit power accordingly and closed-loop power-control where an active radio link (RL) measures the received signal power from all user equipments and simultaneously commands the individual user equipments to raise or lower their transmit uplink power such that the received signal-to-noise ratio (SNR) from all user equipments at the radio links is the same.

FIG. 1A is an exemplary diagram illustrating a WCDMA handset communicating with two WCDMA base stations, in accordance with an embodiment of the invention. Referring to FIG. 1A, there is shown a mobile handset or user equipment 120, a plurality of base stations BS 122 and BS 124 and a plurality of radio links (RL), $RL_1$ and $RL_2$ coupling the user equipment 120 with the base stations BS 122 and BS 124 respectively. The user equipment 120 may comprise a processor 142, a memory 144, and a radio 146.

The processor 142 may communicate and/or control a plurality of bits to/from the base stations BS 122 and BS 124. The memory 144 may comprise suitable logic, circuitry, and/or code that may store data and/or control information. The radio 146 may comprise transmit circuitry and/or receive circuitry that may be enabled to calculate a signal to noise ratio (SNR) of a downlink dedicated physical channel (DPCH) based on a plurality of transmit power control (TPC) bits received via the downlink dedicated physical channel (DPCH), wherein the plurality of TPC bits are not known when they are received. The radio links that belong to the same radio link set broadcast the same values of transmit power control (TPC) bits. The radio links that belong to different radio link sets may broadcast different TPC bits. The user equipment 120 may receive TPC bits via multiple radio links, for example, $RL_1$ and $RL_2$ simultaneously. In a handover situation, the user equipment 120 may receive signals from multiple radio link sets simultaneously.

The WCDMA specification defines the physical random access channel (PRACH) for mobile phone uplinks and the acquisition indicator channel (AICH) for BTS downlinks. Communication is established when the user equipment 120 completes its search for a base station, for example, BS 122 and synchronizes its PRACH uplink signal with the BTS AICH downlink signal. When operating properly, the base station recognizes a PRACH preamble from the user equipment 120 and responds with an AICH to establish a communication link. The user equipment 120 may use the PRACH to transmit its setting of its open loop power control to the base station 122. Incorrect data in the PRACH preamble or problems with the signal quality may cause missed connections, disrupt the capacity of the cell or prevent response from the base station 122.

Figure 1B:
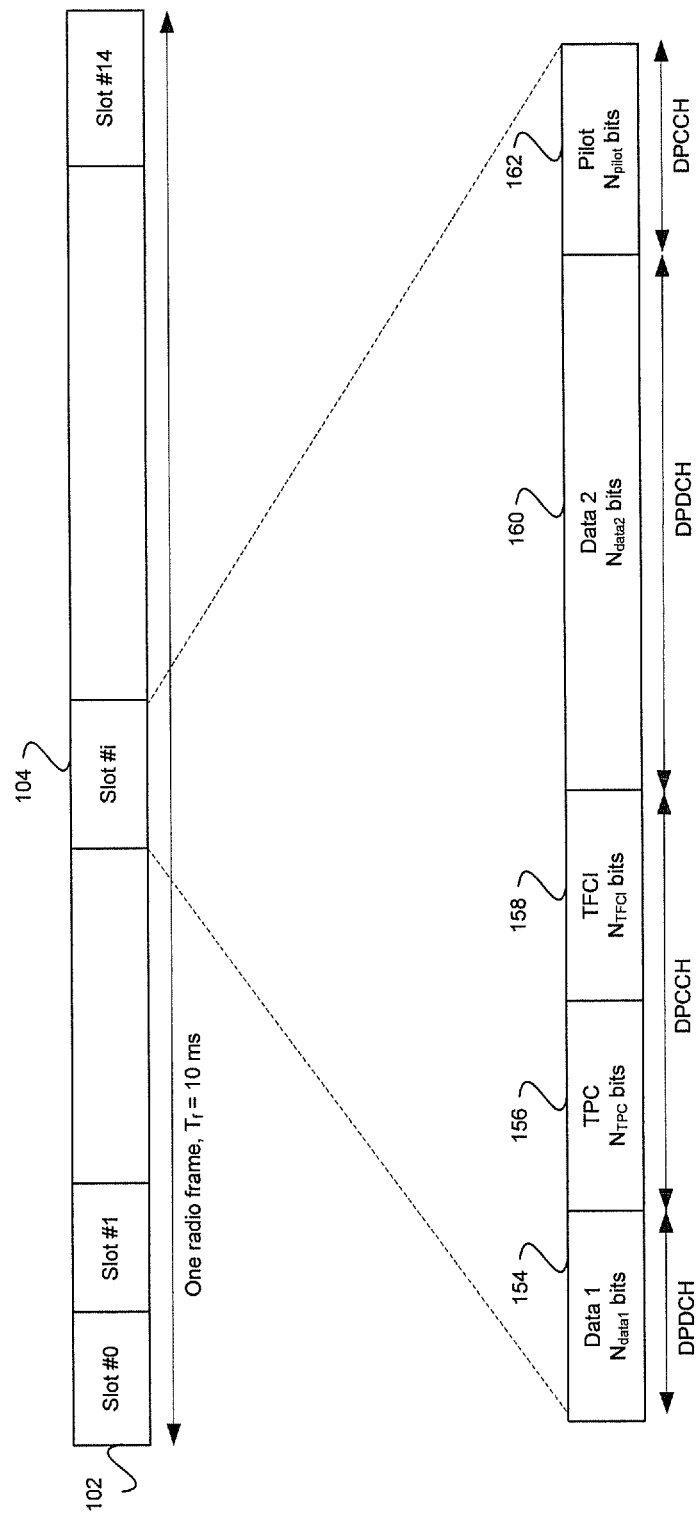
FIG. 1B is a block diagram of an exemplary radio frame format of a downlink dedicated physical channel (DPCH), in accordance with an embodiment of the invention.

FIG. 1B is a block diagram of an exemplary radio frame format of a downlink dedicated physical channel (DPCH), in accordance with an embodiment of the invention. With reference to FIG. 1B there is shown a radio frame format 102, with a time period $T_f$ equal to 10 ms, for example. The radio frame 102 may comprise a plurality of slots, for example, 15 slots. Each of the slots in the radio frame 102, for example, slot # i 104 may comprise a plurality of dedicated physical data channels (DPDCH) and a plurality of dedicated physical control channels (DPCCH). The time period of each slot in the radio frame 102, for example, time period of slot # i may be equal to $10*2^k$ bits, where k=0 . . . 7, for example.

The DPDCH is a type of downlink channel, which may be represented as an I/Q code multiplexed within each radio frame 102. The downlink DPDCH may be utilized to carry data, for example, data 1 154 comprising $N_{data1}$ bits and data 2 160 comprising N$_{data2}$ bits. There may be zero, one, or a plurality of downlink dedicated physical data channels on each radio link.

The DPCCH is a type of downlink channel, which may be represented as an I/Q code multiplexed within each radio frame 102. The downlink DPCCH may be utilized to carry control information generated at the physical layer. The control information may comprise a transmit power control (TPC) block 156 comprising N$_{TPC}$ bits per slot, a transport format combination indicator (TFCI) block 158 comprising N$_{TFCI}$ bits per slot and a pilot block 162 comprising N$_{pilot}$ bits per slot.

Unlike the pilot bits 162 which are known a priori, that is, they are known when received by a receiver, the TPC bits 156 may be known or unknown when they are received. The term "a priori" means "formed or conceived beforehand." The phrase "not known" means that when some or all of the TPC bits are received at the receiver, the receiver cannot determine their actual values, and may need to determine the quality of the channel in order to determine whether the TPC bits are valid or not. Accordingly, various embodiments of the invention utilize channel quality to determine whether the TPC bits are valid or invalid.

In an embodiment of the invention, the quality of the downlink control channel transmitted with the downlink dedicated physical channel (DPCH) may be determined. Within one downlink DPCH, dedicated data may be transmitted in time-multiplex manner with control information. The control information may comprise pilot bits, transport format combination indicator (TFCI) bits and transmit power control (TPC) bits.

The user equipment 120 may be enabled to estimate the quality of reception of the TPC bits. The user equipment 120 may be, for example, a handheld phone or a card in a laptop computer, for example. If the TPC bits are received under reliable channel conditions, they may be demodulated correctly by the user equipment 120, which in turn may detect correctly the power control commands sent down by the serving radio link, and adjust its transmit power appropriately, thereby avoiding interference. On the other hand, if the TPC bits are received under poor channel conditions, the TPC commands may be decoded incorrectly by the user equipment 120, which in turn may be transmitting inappropriate transmit power levels, creating undesirable interference and limiting the system capacity.

In order to ensure proper functioning of the system, the user equipment 120 may be configured to turn OFF or disable its transmitter circuitry in the radio 146 when the determined channel condition of the TPC bits is below a first channel condition threshold and turning the user equipment's transmitter circuitry in the radio 146 back ON or enable the user equipment's transmitter circuitry in the radio 146 when the determined channel condition of the TPC bits is above a second channel condition threshold. The TPC bits are not known when they are received unlike other control information, which is known a priori. The conventional methods of computing a signal-to-noise ratio (SNR) metric based on multiplying the received signal by an a priori known sequence may not be used here.

Figure 2:
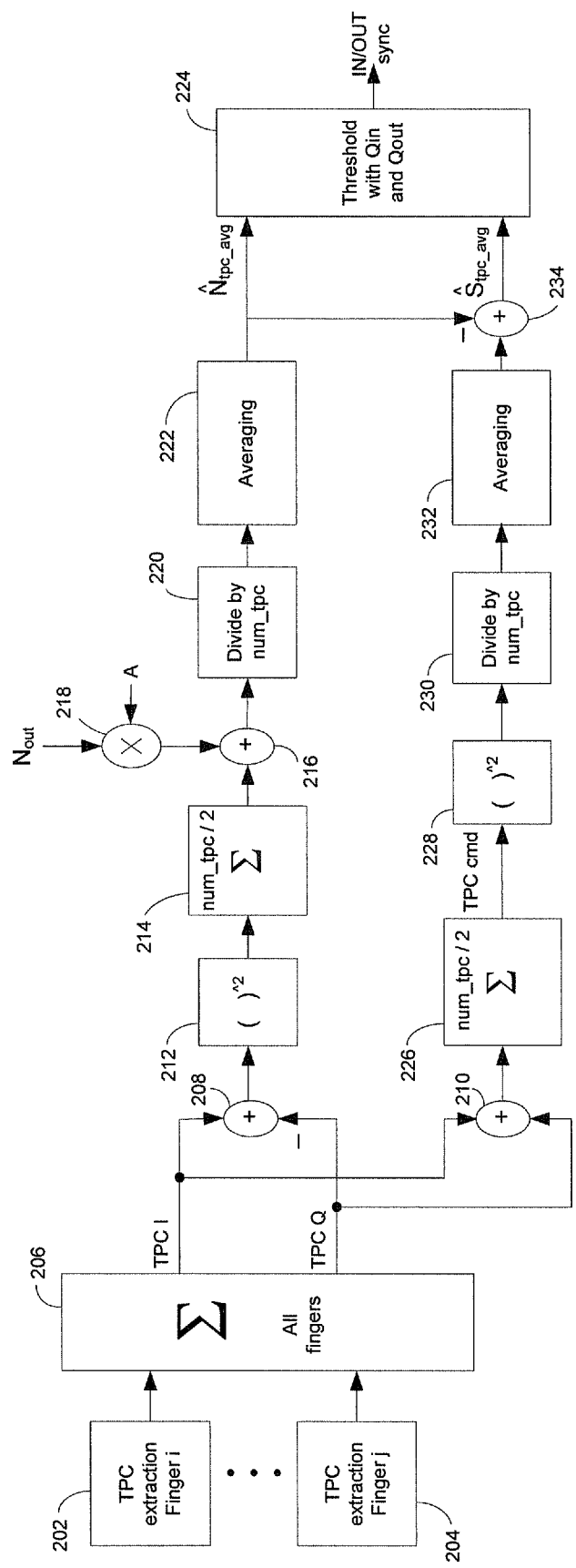
FIG. 2 is a block diagram illustrating determination of synchronization status in a WCDMA network, in accordance with an embodiment of the invention.

FIG. 2 is a block diagram illustrating determination of synchronization status in a WCDMA network, in accordance with an embodiment of the invention. Referring to FIG. 2, there is shown a plurality of TPC extraction fingers, for example, TPC extraction finger i 202 and TPC extraction finger j 204, a plurality of summing blocks 206, 208, 210, 214, 216, 226 and 234, a plurality of squaring blocks 212 and 228, a multiplier 218, a plurality of divider blocks 220 and 230, a plurality of averaging blocks 222 and 232 and a threshold detector block 224.

The signal to noise ratio (SNR) or equivalently the signal and noise power components of the TPC command received from a given radio link set may be computed. A receiver technique that uses several baseband correlators to individually process several signal multipath components, for example, a rake receiver may be utilized. The correlator outputs also known as fingers may be combined to achieve improved communications reliability and performance.

U.S. application Ser. No. 11/173,871 filed Jun. 30, 2005, provides a detailed description of a rake receiver, and is hereby incorporated by reference in its entirety.

In a multipath-fading environment, a receiver structure may assign fingers to the multiple received paths, for example, TPC extraction finger i 202 and TPC extraction finger j 204. All fingers belonging to the same radio link (RL) set may be summed by the summing block 206 to generate TPC_I_finger_sum (k) and TPC_Q_finger_sum (k) where k is index of the RL set.

For signal power, the value of the TPC bits may not be known when they are received but all TPC bits received within a slot may have the same value. Therefore, by adding the I and Q components, the signal portion may add itself coherently, while the noise may add itself incoherently. This effect in a noise reduction and the signal power may be extracted. The i-th received TPC bit at a given slot and finger j may be expressed as:

$$\text{TPC\_bit}_{ij} = \sqrt{\frac{S_{TPC}}{2}} s_{b_i} |h_j|^2 + \underset{\text{or imag}}{\text{real}} (h_j^* n_{ij}). \quad (1)$$

where $S_{TPC}$ may be the signal power, $s_{bi}$ may be the value of the TPC bit and may be either + or −1, $h_j$ may be the complex channel gain at finger j and $n_{ij}$ may be a complex random variable representing the noise component of variance denoted by $$I_{oc} + I_{or} \sum_{k \neq j} |h_k|^2,$$

where $I_{or}$ is the total transmit power spectral density of the downlink signal at the base station antenna connector and $I_{oc}$ may be the power spectral density of a band limited white noise source (simulating interference from cells) as measured at the UE antenna connector. The fingers corresponding to the radio links belonging to the same RL set together may be summed according to the following equation:

$$\text{TPC\_bit}_i = \sqrt{\frac{S_{TPC}}{2}} s_{b_i} \sum_j |h_j|^2 + \sum_j \underset{\text{or imag}}{\text{real}} (h_j^* n_{ij}). \quad (2)$$

The TPC command may be the sum of the set of received TPC bits within a slot. Depending on the slot format, the number of TPC bits per slot, denoted by num_tpc may change.

$$\text{TPC\_cmd} = \qquad (3)$$

$$\text{num\_tpc}\sqrt{\frac{S_{TPC}}{2}}\, s_{b_i} \sum_j |h_j|^2 + \sum_i^{num\_tpc/2} \sum_j \text{real}(h_j^* n_{ij}) + \text{imag}(h_j^* n_{ij}).$$

$$\text{TPC\_cmd}^2 = \text{num\_tpc}^2 \frac{S_{TPC}}{2}\left(\sum_j |h_j|^2\right)^2 + \qquad (4)$$

$$\left(\sum_i^{num\_tpc/2} \sum_j \text{real}(h_j^* n_{ij}) + \text{imag}(h_j^* n_{ij})\right)^2.$$

where $$E\left[\left(\sum_i^{num\_tpc/2} \sum_j \text{real}(h_j^* n_{ij}) + \text{imag}(h_j^* n_{ij})\right)^2\right] =$$

$$\frac{\text{num\_tpc}}{2}\sum_j |h_j|^2 \left(I_{oc} + I_{or}\sum_{k\neq j}|h_k|^2\right).$$

The SNR of TPC command to be estimated may be:

$$SNR_{TPC\_cmd} = \text{num\_tpc}\frac{S_{TPC}\left(\sum_j |h_j|^2\right)^2}{\sum_j |h_j|^2 \left(I_{oc} + I_{or}\sum_{k\neq j}|h_k|^2\right)}. \qquad (5)$$

The TPC bits are received on I and Q components, composing a symbol. For example, if the total number of bits within a slot is equal to 2, TPC_bit$_1$ may be received on the I component as TPC$_{I1}$, and TPC_bit$_2$ may be received on the Q component as TPC$_{Q1}$. If the total number of bits within a slot may be equal to num_tpc, there are num_tpc/2 I components and num_tpc/2 Q components.

The TPC bits (I and Q) may be summed by summing blocks 210 and 226 to generate TPC_sum (k), where num_tpc may be the number of TPC bits per slot and k is the index of a given radio link set. The generated sum TPC_sum (k) may be squared by the squaring block 228 to generate TPC_sum_sqr (k) and a new estimate may be obtained once per slot. The generated TPC_sum_sqr (k) may be divided by the number of TPC bits by the divider block 230 to generate TPC_sum_sqr_norm (k) according to the following equation:

TPC_sum_sqr_norm(k)=TPC_sum_sqr(k)/num_tpc

The generated norm TPC_sum_sqr_norm (k) may be averaged over a given time window by the averaging block 232 to generate TPC_sum_sqr_avg (k). An integrate-and-dump method, or an IIR filter may be utilized to carry out the averaging operation, for example.

In an embodiment of the invention, the signal power $\hat{S}_{tpc}$ may be computed according to the following equations:

$$\text{TPC\_sum\_sqr\_norm} = \frac{1}{\text{num\_tpc}}\left(\sum_{i=1}^{num\_tpc/2} TPC_{Ii} + TPC_{Qi}\right)^2. \qquad (6)$$

In additive white gaussian noise (AWGN), $$\hat{S}_{tpc} = E[\text{TPC\_sum\_sqr\_norm}] = \frac{S_{tpc}}{2}\text{num\_tpc} + \frac{I_{oc}}{2}. \qquad (7)$$

In flat fading, $$\hat{S}_{tpc} = E[\text{TPC\_sum\_sqr\_norm}] = \frac{S_{tpc}}{2}|h|^4\text{num\_tpc} + \frac{I_{oc}}{2}|h|^2. \qquad (8)$$

where h may be the complex channel gain at the finger.

In space time transmit diversity (STTD) flat fading, $$\hat{S}_{tpc} = \qquad (9)$$

$$E[\text{TPC\_sum\_sqr\_norm}] = \frac{S_{tpc}}{4}\left(\sum_{m=1}^2 |h_m|^2\right)^2 \text{num\_tpc} + \frac{I_{oc}}{2}\left(\sum_{m=1}^2 |h_m|^2\right).$$

where h$_m$ is the complex channel gain corresponding to transmit antenna m in the base station.

In closed loop 1 (CL1) flat fading, $$\hat{S}_{tpc} = E[\text{TPC\_sum\_sqr\_norm}] = \qquad (10)$$

$$\frac{S_{tpc}}{4}\|h_1 + wh_2\|^4\text{num\_tpc} + \frac{I_{oc}}{2}\|h_1 + wh_2\|^2.$$

where h$_1$ and h$_2$ are the complex channel gains from the base station transmit antennas 1 and 2 and w is a weight.

In closed loop 2 (CL2) flat fading, $$\hat{S}_{tpc} = E[\text{TPC\_sum\_sqr\_norm}] = \qquad (11)$$

$$\frac{S_{tpc}}{4}\|w_1 h_1 + w_2 h_2\|^4\text{num\_tpc} + \frac{I_{oc}}{2}\|w_1 h_1 + w_2 h_2\|^2.$$

where h$_1$ and h$_2$ are the complex channel gains from the base station transmit antennas 1 and 2 and w$_1$ and w$_2$ are weights.

In another embodiment of the invention, the signal power estimate may be further improved by computing Stpc_avg (k) using the summer block 234 according to the following equation:

Stpc_avg(k)=TPC_sum_sqr_avg(k)−Ntpc_avg(k)

where Ntpc_avg (k) may be the noise power estimate.

An alternative embodiment of the invention may implement a different calculation of the signal power by squaring all TPC bits (I and Q). The squared TPC bits may be summed to generate TPC_sum_sqr (k) and a new estimate may be obtained once per slot. The generated TPC_sum_sqr (k) may be divided by the number of TPC bits to generate TPC_sum_sqr_norm (k) according to the following equation:

TPC_sum_sqr_norm(k)=TPC_sum_sqr(k)/num_tpc

The generated norm TPC_sum_sqr (k) may be averaged over a given time window to generate TPC_sum_sqr_avg (k).

In an embodiment of the invention, the signal power $\hat{S}_{tpc}$ may be computed according to the following equations:

$$\text{TPC\_sum\_sqr\_norm} = \frac{1}{\text{num\_tpc}} \sum_{i=1}^{\text{num\_tpc}/2} TPC_{Ii}^2 + TPC_{Qi}^2. \quad (12)$$

$$\hat{S}_{tpc} = E[\text{TPC\_sum\_sqr\_norm}] = \frac{S_{tpc}}{2} + \frac{I_{oc}}{2}. \quad (13)$$

In another embodiment of the invention, the signal power estimate may be further improved by computing Stpc_avg (k) according to the following equation:

Stpc_avg(k)=TPC_sum_sqr_avg(k)−Ntpc_avg(k)

and may be scaled by the average number of TPC bits over the averaging time period according to the following equation:

Stpc_avg(k)=Stpc_avg(k)*num_tpc_avg(k)

where num_tpc may vary from slot to slot.

For noise power, the value of the TPC bits may not be known when they are received but all TPC bits received within a slot may have the same value. Therefore, by subtracting the I component from the Q component or vice-versa, the signal portion cancels itself out, leaving the residual noise.

In an embodiment of the invention, the noise power may be computed from TPC bits only. The sign bit on both the I and Q components of the TPC symbol may be the same. Therefore for each symbol, $$TPC_I - TPC_Q = n_I - n_Q \quad (14.)$$

Since there are $$\frac{\text{num\_tpc}}{2}$$

symbols per slot, there are $$\frac{\text{num\_tpc}}{2}$$

noise samples per slot.

In AWGN the noise power estimate may be generated according to the following equation:

$$\hat{N}_{tpc} = E\left[\sum_{i=1}^{\text{num\_tpc}/2} (TPC_{Ii} - TPC_{Qi})^2\right] \quad (15)$$

$$= E\left[\sum_{i=1}^{\text{num\_tpc}/2} (n_{Ii} - n_{Qi})^2\right]$$

$$= \text{num\_tpc} \cdot \frac{I_{oc}}{2}.$$

In flat fading the noise power estimate may be generated according to the following equation:

$$\hat{N}_{tpc} = |h|^2 \text{num\_tpc} \cdot \frac{I_{oc}}{2}. \quad (16)$$

In STTD flat fading the noise power estimate may be generated according to the following equation:

$$\hat{N}_{tpc} = \left(\sum_{m=1}^{2} |h_m|^2\right) \text{num\_tpc} \cdot \frac{I_{oc}}{2}. \quad (17)$$

In CL1 flat fading the noise power estimate may be generated according to the following equation:

$$\hat{N}_{tpc} = \|h_1 + w h_2\|^2 \text{num\_tpc} \cdot \frac{I_{oc}}{2}. \quad (18)$$

In CL2 flat fading the noise power estimate may be generated according to the following equation:

$$\hat{N}_{tpc} = \|w_1 h_1 + w_2 h_2\|^2 \text{num\_tpc} \cdot \frac{I_{oc}}{2}. \quad (19)$$

The TPC bits may be subtracted from each other (I–Q) by the summing block 208. The subtracted TPC bits may be squared by the squaring block 212 to generate TPC_sqr_diff (k). The squared difference TPC_sqr_diff(k) may be summed by the summing block 214 over the number of TPC symbols, where the number of symbols per slot may be equal to num_tpc/2 to generate Ntpc (k) and a new estimate may be obtained once per slot. The sum Ntpc (k) may be divided by the number of TPC bits by the divider block 220 to generate Ntpc_norm (k) according to the following equation:

Ntpc_norm(k)=Ntpc(k)/num_tpc

The generated norm Ntpc_norm (k) may be averaged by the averaging block 222 over a given time window to generate Ntpc_avg (k).

An alternative embodiment of the invention may improve the accuracy on the noise power estimate. The noise power may be computed based on the TPC bits received within a slot as the TPC bits are not known when they are received. For slot formats with a small number of TPC bits per slot, for example, 2 TPC bits per slot, the variance of the noise power estimate may be quite large. This embodiment improves the noise estimate by augmenting the noise estimated from TPC bits by other sources of noise estimates. By adding extra samples of noise estimates for a given slot and averaging over the total number of noise samples available, the variance of the estimate may be reduced or the estimate may be more accurate.

In an exemplary embodiment of the invention, the noise estimate may be augmented from the estimate obtained from the reception of the dedicated pilot bits 162 (FIG. 1B), or the common pilot bits (CPICH). A scaling factor denoted by A, between the outsourced noise power estimate Nout and the noise power estimate from the TPC bits may be used and the improved noise estimate Ntpc_aug (k) may be computed using the multiplier 218 according to the following equation:

Ntpc_aug(k)=(Ntpc(k)+A*Nout(k))/2

A is a scaling factor that may be dependent upon the number of TPC bits per slot.

In an embodiment of the invention, the noise power may be computed from a combination of TPC bits and pilot bits. In a non-diversity flat fading case, the soft value of each of the dedicated pilot bits at each slot on may be obtained from the hardware and the i-th pilot symbol may be represented by the following equation:

$$z_i = \sqrt{\frac{S_{DED}}{2}} x_i |h|^2 + n_i h^*. \quad (20)$$

The number of dedicated pilot bits per slot may be denoted by num_ded and all num_ded/2 dedicated pilot symbols may be stacked in a vector according to the following equation:

$$\underline{z} = \sqrt{\frac{S_{DED}}{2}} |h|^2 \underline{x} + \underline{n}'. \quad (21)$$

where n' may be the post-combining noise of the power to be estimated.
The pilot symbol sequence $$\underline{x}^T = \left[ x_0, x_1, x_2, \ldots, x_{\frac{num\_ded}{2}-1} \right]$$

may be known when they are received, and it may be possible to find an orthogonal sequence $$\underline{y}^T = \left[ y_0, y_1, y_2, \ldots, y_{\frac{num\_ded}{2}-1} \right]$$

such that $$\underline{y}^H \underline{x} = 0 \quad (22.)$$

Since the pilot symbols are comprised of −1s and 1s, the sequence in $\underline{y}$ may be also comprised of −1s and 1s. Multiplying the received symbols $\underline{z}$ by $\underline{y}^H$ involves a sign change manipulation on the received $\bar{I}$ and $\bar{Q}$.

$$\underline{y}^H \underline{z} = \underline{y}^H \underline{n}' \quad (23.)$$

The variance of n' may be $$\sigma_{n'}^2 = |h|^2 I_{oc} = E[n_i' n_i'^*], i = 0, \ldots, \frac{num\_ded}{2} - 1. \quad (24)$$

If the orthogonal sequence $\underline{y}$ may be normalized such that $$\underline{y}^H \underline{y} = 1 \quad (25.)$$

Then the variance of $\underline{y}^H \underline{n}'$ may be $$E[\underline{y}^H \underline{n}' \underline{n}'^H \underline{y}] = \sigma_{n'}^2 \quad (26.)$$

From equation (16.), the noise power from TPC bits may be $$\hat{N}_{tpc} = |h|^2 \text{num\_tpc} \cdot \frac{I_{oc}}{2}. \quad (27)$$

Total noise estimate may be:

$$\hat{N} = \left( \hat{N}_{tpc} + \frac{\text{num\_tpc}}{2} \cdot \sigma_{n'}^2 \right) / 2. \quad (28)$$

In the case of flat fading STTD with the number of pilot bits >2. From the hardware, the soft value of each dedicated pilot bits at each slot may be obtained. The i-th received dedicated pilot symbol for antenna 1 may be equal to:

$$z_{1i} = \sqrt{\frac{S_{DED}}{4}} (x_{1i} h_1 + x_{2i} h_2) h_1^* + n_i h_1^*. \quad (29)$$

Similarly for antenna 2, $$z_{2i} = \sqrt{\frac{S_{DED}}{4}} (x_{1i} h_1 + x_{2i} h_2) h_2^* + n_i h_2^*. \quad (30)$$

All num_ded/2 dedicated pilot symbols may be stacked in a vector according to the following equations:

$$\underline{z}_1 = \sqrt{\frac{S_{DED}}{4}} (\underline{x}_1 h_1 + \underline{x}_2 h_2) h_1^* + \underline{n}_1'. \quad (31)$$

$$\underline{z}_1 = \sqrt{\frac{S_{DED}}{4}} (\underline{x}_1 |h_1|^2 + \underline{x}_2 h_2 h_1^*) + \underline{n}_1'. \quad (32)$$

$$\underline{z}_1 = \sqrt{\frac{S_{DED}}{4}} [\underline{x}_1 \underline{x}_2] \begin{bmatrix} |h_1|^2 \\ h_2 h_1^* \end{bmatrix} + \underline{n}_1'. \quad (33)$$

And $$\underline{z}_2 = \sqrt{\frac{S_{DED}}{4}} [\underline{x}_1 \underline{x}_2] \begin{bmatrix} h_1 h_2^* \\ |h_2|^2 \end{bmatrix} + \underline{n}_2'. \quad (34)$$

The pilot symbol sequences $\underline{x}_1$ and $\underline{x}_2$ are known when they are received and it may be possible to find an orthogonal sequence $\underline{y}^T$ such that $$\underline{y}^H \underline{x}_1 = 0 \text{ and } \underline{y}^H \underline{x}_2 = 0 \quad (35.)$$

$$\underline{y} \underline{z}_1 = \underline{y}^H \underline{n}_1' \text{ and } \underline{y}^H \underline{z}_2 = \underline{y}^H \underline{n}_2' \quad (36.)$$

The variance of $n_1'$ may be $$\sigma_{n_1'}^2 = |h_1|^2 I_{oc} = E[n_{1i}' n_{1i}'^*], i = 0, \ldots, \frac{num\_ded}{2} - 1. \quad (37)$$

And $$\sigma_{n_2'}^2 = |h_2|^2 I_{oc}. \quad (38)$$

If the orthogonal sequence $\underline{y}$ may be normalized such that $$\underline{y}^H \underline{y} = 1 \quad (39.)$$

Then the variance of $\underline{y}^H \underline{n}_i'$ may be $$E[\underline{y}^H \underline{n}_i' \underline{n}_i'^H \underline{y}] = \sigma_{n_i'}^2, i = 1, 2 \quad (40.)$$

Thus the noise power from the dedicated pilot bits may be obtained by the following equation:

$$|\underline{y}^H \underline{z}_1|^2 + |\underline{y}^H \underline{z}_2|^2 = \sigma_{n_1'}^2 + \sigma_{n_2'}^2 = (|h_1|^2 + |h_2|^2) I_{oc} \quad (41.)$$

From equation (17.) the noise power from TPC bits may be $$\hat{N}_{tpc} = \left( \sum_{m=1}^{2} |h_m|^2 \right) \text{num\_tpc} \cdot \frac{I_{oc}}{2}. \quad (42)$$

Total noise estimate may be:

$$\hat{N} = \left(\hat{N}_{tpc} + \frac{\text{num\_tpc}}{2} \cdot (\sigma_{n'_1}^2 + \sigma_{n'_2}^2)\right)/2. \quad (43)$$

When the number of pilot bits=2, the 2 pilot bits broadcast by antenna 2 precede the last two bits of the data2 field. The pilot bits are STTD-encoded with the data and thus need to be retrieved post-STTD decoding. The hardware may be provisioned to extract pilot bits at the output of the combiner, post-STTD decoding. The pilot symbol obtained post-STTD decoding may be:

$$z = \sqrt{\frac{S_{DED}}{4}}\, x_1 \sum_{m=1}^{2} |h_m|^2 + \sum_{m=1}^{2} h_m^* n_m. \quad (44)$$

where $x_1$ may be the known pilot symbol sent from antenna 1 and $$E\left[\left(\sum_{m=1}^{2} h_m^* n_m\right)^2\right] = \left(\sum_{m=1}^{2} |h_m|^2\right) I_{oc}.$$

$$pilotI = \text{Re}(z) = \sqrt{\frac{S_{DED}}{4}}\, I_{seq} \sum_{m=1}^{2} |h_m|^2 + \text{Re}\left(\sum_{m=1}^{2} h_m^* n_m\right). \quad (45)$$

$$pilotQ = \text{Im}(z) = \sqrt{\frac{S_{DED}}{4}}\, Q_{seq} \sum_{m=1}^{2} |h_m|^2 + \text{Im}\left(\sum_{m=1}^{2} h_m^* n_m\right). \quad (46)$$

The hardware multiplies pilotI and pilotQ by $I_{seq}$ and $Q_{seq}$ respectively and generates the 2 bits. The noise power may be calculated by the following equations:

$$\sigma_n^2 = (pilotI - pilotQ)^2 \quad (47.)$$

$$\sigma_n^2 = (|h_1|^2 + |h_2|^2) I_{oc} \quad (48.)$$

And thus total noise estimate may be:

$$\hat{N} = \left(\hat{N}_{tpc} + \frac{\text{num\_tpc}}{2} \cdot \sigma_n^2\right)/2. \quad (49)$$

In the case of CL1 flat fading, the soft value of each dedicated pilot bits at each slot on a per-finger basis may be obtained from the hardware.

$$z_1 = \sqrt{\frac{S_{DED}}{4}}\, [x_1\ x_2]\begin{bmatrix} |h_1|^2 \\ w h_1^* h_2 \end{bmatrix} + n'_1. \quad (50)$$

And $$z_2 = \sqrt{\frac{S_{DED}}{4}}\, [x_1\ x_2]\begin{bmatrix} h_1 h_2^* \\ w|h_2|^2 \end{bmatrix} + n'_2. \quad (51)$$

The weight w may be known in the firmware, $$z = z_1 + w^* z_2 \quad (52)$$

$$= \sqrt{\frac{S_{DED}}{4}}\, [x_1\ x_2]\begin{bmatrix} |h_1|^2 + w^* h_1 h_2^* \\ w h_1^* h_2 + |w|^2 |h_2|^2 \end{bmatrix} + n'_1 + w^* n'_2.$$

Multiplying $\underline{z}$ by the orthogonal sequence $\underline{y}$, $$\underline{y}^H \underline{z} = \underline{y}^H(\underline{n}'_1 + w^* \underline{n}'_2). \quad (53)$$

$$\underline{y}^H \underline{z} = \underline{y}^H \left( \begin{bmatrix} n_0 h_1^* \\ \vdots \\ n_{\frac{\text{num\_ded}}{2}-1} h_1^* \end{bmatrix} + w^* \begin{bmatrix} n_0 h_2^* \\ \vdots \\ n_{\frac{\text{num\_ded}}{2}-1} h_2^* \end{bmatrix} \right). \quad (54)$$

$$\underline{y}^H \underline{z} = \underline{y}^H \left( \begin{bmatrix} n_0 (h_1^* + w^* h_2^*) \\ \vdots \\ n_{\frac{\text{num\_ded}}{2}-1} (h_1^* + w^* h_2^*) \end{bmatrix} \right) = \underline{y}^H \underline{n}_{cl1}. \quad (55)$$

The variance of $\underline{n}_{cl1}$ may be $$\sigma_{\underline{n}_{cl1}}^2 = \|h_1 + w h_2\|^2 I_{oc} = E[n_{cl1i} n_{cl1i}^*], \quad (56)$$

$$i = 0, \ldots, \frac{\text{num\_ded}}{2} - 1.$$

$$|\underline{y}^H \underline{z}|^2 = \sigma_{\underline{n}_{cl1}}^2. \quad (57)$$

From equation (18.) the noise power from TPC bits may be $$\hat{N}_{tpc} = \|h_1 + w h_2\|^2 \text{num\_tpc} \cdot \frac{I_{oc}}{2}. \quad (58)$$

Total noise estimate may be:

$$\hat{N} = \left(\hat{N}_{tpc} + \frac{\text{num\_tpc}}{2} \cdot \sigma_{\underline{n}_{cl1}}^2\right)/2. \quad (59)$$

In the case of CL2 fading, the same pilot pattern may be used on both the antennas.

$$z_{1i} = \sqrt{\frac{S_{DED}}{4}}\, (w_1 h_1 + w_2 h_2) x_i h_1^* + n_i h_1^*. \quad (60)$$

All num_ded/2 dedicated pilot symbols may be stacked in a vector according to the following equations:

$$\underline{z}_1 = \sqrt{\frac{S_{DED}}{4}}\, (w_1 h_1 + w_2 h_2) \underline{x} h_1^* + \underline{n}'_1. \quad (61)$$

$$\underline{z}_2 = \sqrt{\frac{S_{DED}}{4}}\, (w_1 h_1 + w_2 h_2) \underline{x} h_2^* + \underline{n}'_2. \quad (62)$$

The weights $w_1$ and $w_2$ are known in the firmware, $$z = w_1^* z_1 + w_2^* z_2. \tag{63}$$

$$z = \sqrt{\frac{S_{DED}}{4}} \|w_1 h_1 + w_2 h_2\|^2 \underline{x} + w_1^* \underline{n}_1' + w_2^* \underline{n}_2'. \tag{64}$$

Multiplying $\underline{z}$ by the orthogonal sequence $\underline{y}$, $$|\underline{y}^H \underline{z}|^2 = \sigma_{\underline{n}_{cl2}}^2 = \|w_1 h_1 + w_2 h_2\|^2 I_{oc} \tag{65.}$$

From equation (19.) the noise power from TPC bits may be $$\hat{N}_{tpc} = \|w_1 h_1 + w_2 h_2\|^2 \text{num\_tpc} \cdot \frac{I_{oc}}{2}. \tag{66}$$

Total noise estimate may be:

$$\hat{N} = \left( \hat{N}_{tpc} + \frac{\text{num\_tpc}}{2} \cdot \sigma_{\underline{n}_{cl2}}^2 \right) / 2. \tag{67}$$

The various embodiments described above yield a TPC command signal and noise power estimate per radio link set, updated periodically, for example, at the rate of once per slot. These measurements may be compared to predefined thresholds by the threshold detector 224 such that the user equipment 120 (FIG. 1A) turns OFF or disables its transmitter circuitry when the determined channel condition specified by Stpc_avg (k) and Ntpc_avg (k) may be below a first channel condition threshold, denoted by Qout. When such a condition may be detected, the user equipment 120 may be said to be in an "out-of-sync" status. The user equipment 120 may turn its transmitter circuitry back ON when the determined channel condition specified by Stpc_avg (k) and Ntpc_avg (k) may be above a second channel condition threshold, denoted by Qin. When such a condition may be detected, the user equipment 120 may be said to be in an "in-sync" status.

In the case of a single radio link (RL) set, or when only a single RL set is active, the two metrics Stpc_avg and Ntpc_avg may be obtained. A thresholding operation may be carried out by initializing the user equipment 120 sync-status to, for example, "in-sync" status with Sync_status=1.
  If Stpc_avg<Qout*Ntpc_avg
    Sync_status=0 (an "out-of-sync" status may be detected)
  Else if Stpc_avg>Qin*Ntpc_avg
    Sync_status=1 (an "in-sync" status may be detected)
In the case of multiple RL sets, or when a set of K RL sets is active simultaneously, a total of K pairs of Stpc_avg (k) and Ntpc_avg (k) are obtained for k=1 . . . K. The information derived from all these RL sets may be combined to decide on a unique "in-sync" status or "out-of-sync" status for the user equipment 120. There may be only one sync status at the user equipment 120, regardless of the number of RL sets active.

In an embodiment of the invention that determines the overall "in-sync" status or "out-of sync" status for the user equipment, the pairs Stpc_avg (k) and Ntpc_avg (k) may be individually compared to thresholds Qin and Qout, such that a variable Sync_status (k) may be obtained for each RL set. If and only if at least one out of K Sync_status (k) may be "in-sync", the user equipment 120 may have an "in-sync" status. Otherwise, the user equipment 120 may have an "out-of-sync" status.

In another embodiment to determine the overall "in-sync" status or "out-of sync" status for the user equipment 120, a ratio Stpc_avg (k)/Ntpc_avg (k) may be computed for each RL and averaged across the RL. An average SNR may be obtained across RL sets according to the following equation:

$$SNR = \frac{1}{K} \sum_{k=1}^{K} \frac{\text{Stpc\_avg}(k)}{\text{Ntpc\_avg}(k)}$$

The SNR may be compared to threshold Qin and Qout.
  If SNR<Qout
    Sync_status=0 (an "out-of-sync" status may be detected)
  Else if SNR>Qin
    Sync_status=1 (an "in-sync" status may be detected)
Alternatively, SNR may be obtained from other rules, for example, $$SNR = \max_k \frac{\text{Stpc\_avg}(k)}{\text{Ntpc\_avg}(k)} \text{ or}$$

$$SNR = \min_k \frac{\text{Stpc\_avg}(k)}{\text{Ntpc\_avg}(k)} \text{ or}$$

$$SNR = \text{median}_k \frac{\text{Stpc\_avg}(k)}{\text{Ntpc\_avg}(k)}.$$

Figure 3:
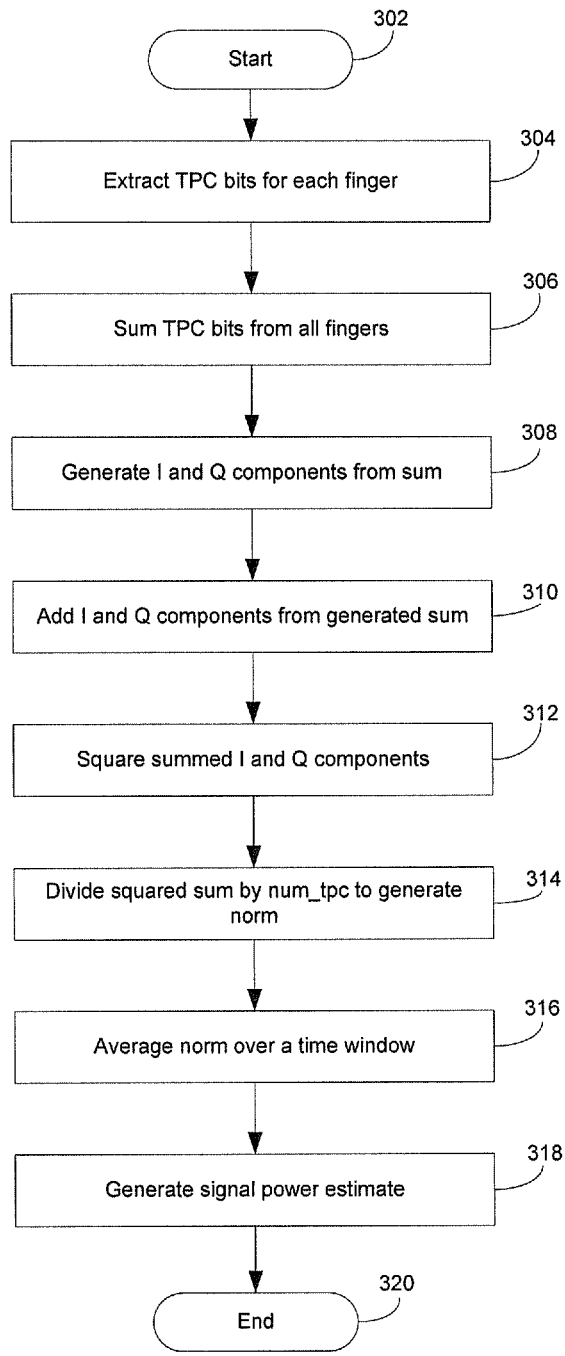
FIG. 3 is a flowchart illustrating exemplary steps to calculate a signal power estimate of the DPCH, in accordance with an embodiment of the invention.

FIG. 3 is a flowchart illustrating exemplary steps to calculate a signal power estimate of the DPCH, in accordance with an embodiment of the invention. Referring to FIG. 3, exemplary steps may begin at step 302. In step 304, the transmit power control (TPC) bits may be extracted from the slot received at each finger. In step 306, the TPC bits extracted from all the fingers may be summed. In step 308, an I component and a Q component may be generated from the summed TPC bits of all the fingers. For signal power, the value of the TPC bits may not be known a priori but all TPC bits received within a slot may have the same value. Therefore, by adding the I and Q components, the signal portion may add itself coherently, while the noise may add itself incoherently. This effect in a noise reduction and the signal power may be extracted. In step 310, the TPC bits (I and Q) may be summed by the summing block 210 to generate TPC_sum (k), where num_tpc is the number of TPC bits per slot. In step 312, the generated sum TPC_sum (k) may be squared by the squaring block 228 to generate TPC_sum_sqr (k) and a new estimate may be obtained once per slot. In step 314, the generated TPC_sum_sqr (k) may be divided by the number of TPC bits per slot, num_tpc, by the divider block 230 to generate TPC_sum_sqr_norm (k) according to the following equation:

TPC_sum_sqr_norm(k)=TPC_sum_sqr(k)/num_tpc

In step 316, the generated norm TPC_sum_sqr_norm (k) may be averaged by the averaging block 232 over a given time window to generate TPC_sum_sqr_avg (k). In step 318, a signal power estimate of the TPC bits in the DPCH may be estimated. Control passes to end step 320.

Figure 4:
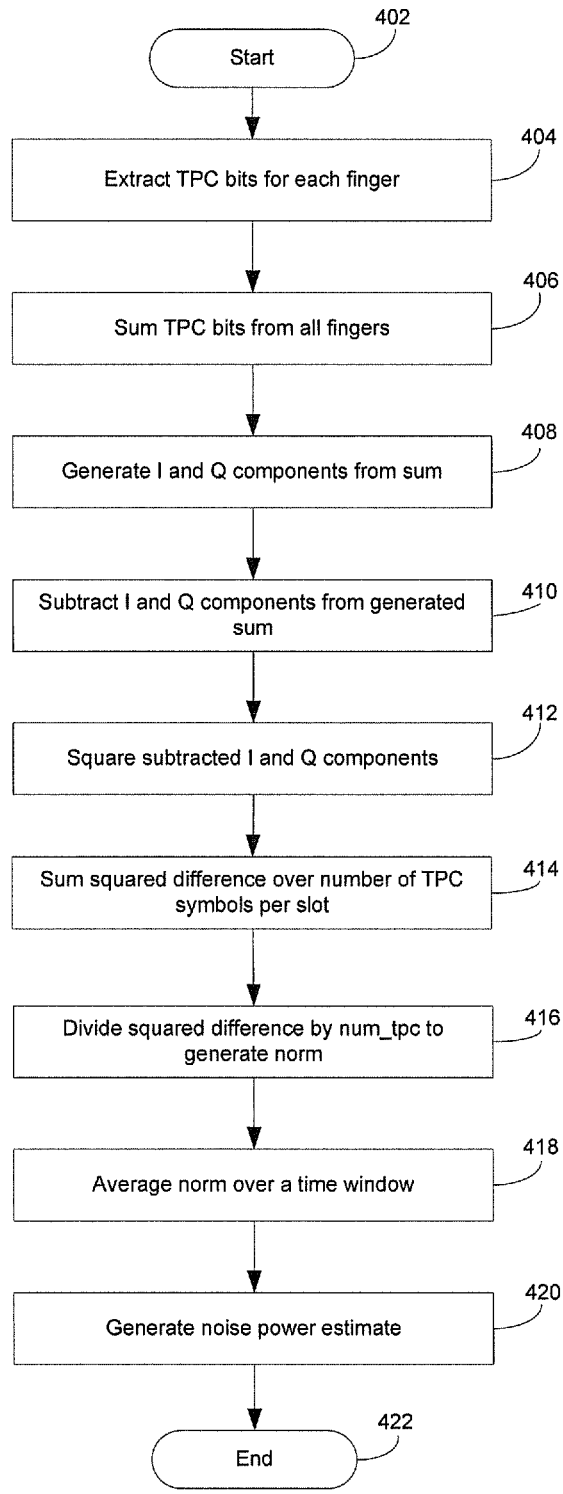
FIG. 4 is a flowchart illustrating exemplary steps to calculate a noise power estimate of the DPCH, in accordance with an embodiment of the invention.

FIG. 4 is a flowchart illustrating exemplary steps to calculate a noise power estimate of the DPCH, in accordance with an embodiment of the invention. Referring to FIG. 4 exemplary steps may begin at step 402. In step 404, the transmit power control (TPC) bits may be extracted from the slot received at each finger. In step 406, the TPC bits extracted from all the fingers may be summed. In step 408, an I component and a Q component may be generated from the summed TPC bits of all the fingers. For noise power, the value of the TPC bits may not be known when they are received but all TPC bits received within a slot may have the same value. Therefore, by subtracting the I component from the Q component or vice-versa, the signal portion cancels itself out, leaving the residual noise.

In step 410, the TPC bits may be subtracted from each other (I-Q) by the summing block 208. In step 412, the subtracted TPC bits may be squared by the squaring block 212 to generate TPC_sqr_diff (k). In step 414, the squared difference TPC_sqr_diff (k) may be summed by the summing block 214 over the number of TPC symbols, where the number of symbols per slot is equal to num_tpc/2 to generate Ntpc (k) and a new estimate may be obtained once per slot. In step 416, the sum Ntpc (k) may be divided by the number of TPC bits by the divider block 220 to generate Ntpc_norm (k) according to the following equation:

$$Ntpc\_norm(k) = Ntpc(k)/num\_tpc$$

In step 418, the generated norm Ntpc_norm (k) may be averaged by the averaging block 222 over a given time window to generate Ntpc_avg (k). In step 420, the noise power estimate of the TPC bits in the DPCH may be estimated. Control passes to end step 422.

Figure 5:
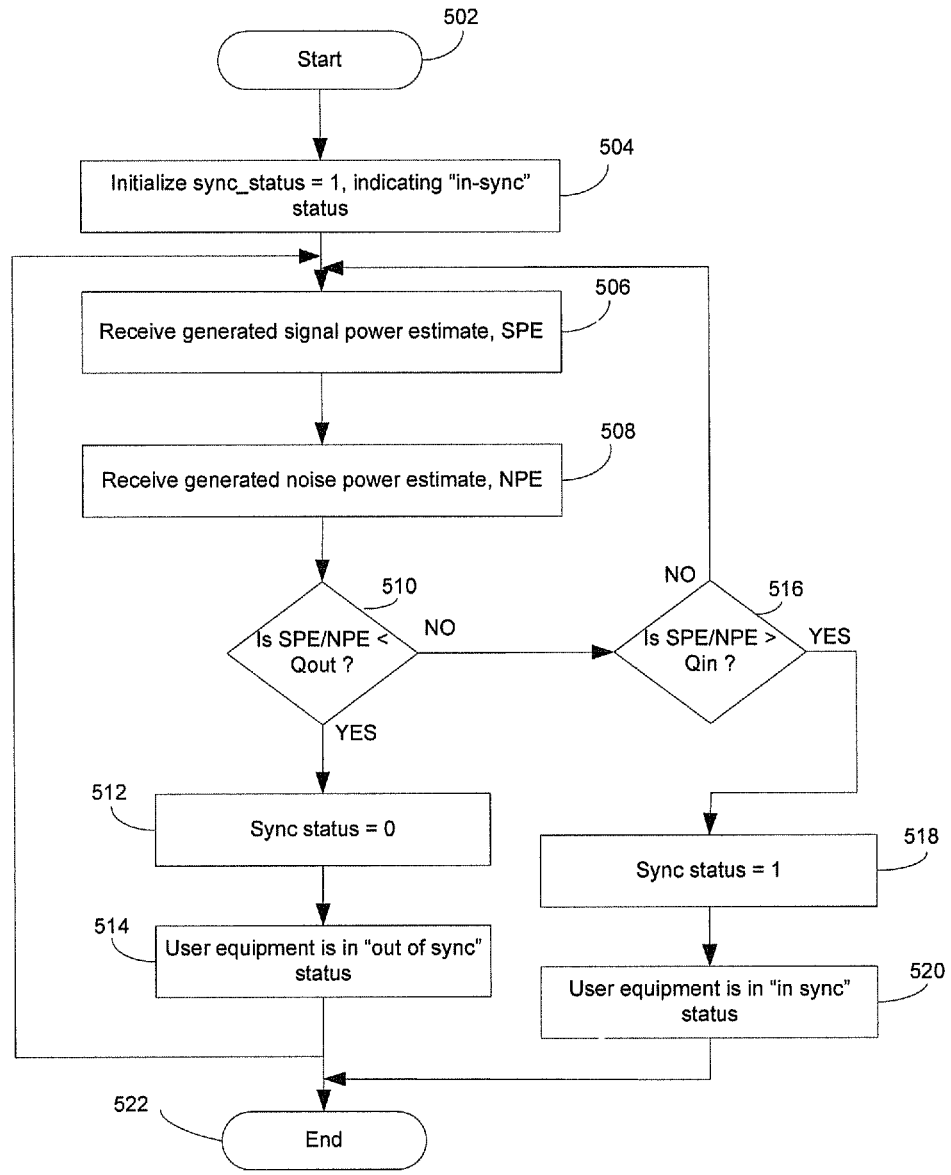
FIG. 5 is a flowchart illustrating exemplary steps to determine the synchronization status in a WCDMA network, in accordance with an embodiment of the invention.

FIG. 5 is a flowchart illustrating exemplary steps to determine the synchronization status in a WCDMA network, in accordance with an embodiment of the invention. Referring to FIG. 5, exemplary steps may begin at step 502. In step 504, the sync status of the user equipment 120 may be initialized to 1, for example, indicating an "in-sync" status. In step 506, the calculated signal power estimate may be received. In step 508, the calculated noise power estimate may be received. In step 510, it may be determined whether the estimated signal to noise ratio is below a certain threshold, Qout. If the estimated signal to noise ratio is below a certain threshold, Qout, control passes to step 512. In step 512, the sync status of the user equipment 120 is initialized to 0. In step 514, the user equipment 120 is indicated to be in "out of sync" status. Control passes to end step 522. If the estimated signal to noise ratio is not below a certain threshold, Qout, control passes to step 516. In step 516, it may be determined whether the estimated signal to noise ratio is above a certain threshold, Qin. If the estimated signal to noise ratio is not above a certain threshold, Qin, the sync status remains unchanged. If the estimated signal to noise ratio is above a certain threshold, Qin, control passes to step 518. In step 518, the sync status of the user equipment 120 is initialized to 1. In step 520, the user equipment 120 is indicated to be in "in sync" status. Control passes to end step 522.

In accordance with an embodiment of the invention, a method and system for determining synchronization status in a WCDMA network may comprise circuitry that enables calculation of signal to noise ratio (SNR) for a downlink dedicated physical channel (DPCH) 102 based on a plurality of transmit power control (TPC) bits 156 received via the DPCH 102 and the TPC bits are not known when they are received. The user equipment 120 may be enabled to control transmit circuitry within the radio 146 based on the calculated SNR. The user equipment 120 may be enabled to disable transmit circuitry within the radio 146 if the calculated SNR of the plurality of TPC bits 156 is below a first channel threshold, Qout. The user equipment 120 may be enabled to enable its transmit circuitry within the radio 146 if the calculated SNR of the plurality of TPC bits 156 is above a second channel threshold, Qin. The user equipment 120 may be enabled to estimate the quality of reception of the TPC bits.

The user equipment 120 may be, for example, a handheld phone or a card in a laptop computer, for example. If the TPC bits are received under reliable channel conditions, they may be demodulated correctly, and the user equipment 120 may detect correctly the commands sent down by the serving radio link, and adjust its transmit power appropriately, thereby avoiding interference. On the other hand, if the TPC bits are received under poor channel conditions, the TPC commands may be decoded incorrectly, and the user equipment 120 may be transmitting inappropriate transmit power levels, creating undesirable interference and limiting the system capacity.

The summing block 206 may comprise circuitry within the user equipment 120 that enables summation of portions of the plurality of TPC bits received via a plurality of multipaths over a downlink dedicated physical channel (DPCH) to generate an in-phase (I) component and quadrature (Q) component. The circuitry within the user equipment 120 enables summing of the generated I component and the generated Q component to determine signal power of the DPCH 102. The squaring block 228 within the user equipment 120 enables squaring of the summed generated I component and generated Q component to determine the signal power of DPCH 102. The divider block 230 within the user equipment 120 enables calculation of a norm of the squared summed generated I component and generated Q component by dividing the squared summed generated I component and generated Q component by num_tpc, a number of plurality of TPC bits per slot of DPCH 102 to determine the signal power of DPCH 102. The averaging block 232 within the user equipment 120 enables averaging of the norm of the squared summed generated I component and generated Q component over a time window.

The summing block 208 within the user equipment 120 enables subtraction of generated I component and generated Q component to determine noise power of DPCH 102. The squaring block 212 within the user equipment 120 enables squaring of the subtracted generated I component and generated Q component to determine the noise power of DPCH 102. The summing block 214 within the user equipment 120 enables summing of the squared subtracted generated I component and generated Q component over a plurality of TPC symbols to determine the noise power of DPCH 102. The plurality of TPC symbols equal half of the plurality of TPC bits per slot of DPCH 102. The divider block 220 within the user equipment 120 enables calculation of a norm of the summed squared subtracted generated I component and generated Q component by dividing the summed squared subtracted generated I component and generated Q component by num_tpc, a number of the plurality of TPC bits per slot of DPCH 102 to determine the noise power of DPCH 102. The averaging block 222 within the user equipment 120 enables averaging of the norm of the summed squared subtracted generated I component and generated Q component over a time window.

The system comprises circuitry that enables calculation of a signal power estimate of the DPCH 102 by subtracting the determined noise power estimate from a calculated value of a signal power estimate of the DPCH 102 according to the following equation:

$$Stpc\_avg(k) = TPC\_sum\_sqr\_avg(k) - Ntpc\_avg(k)$$

and may be scaled by the average number of TPC bits over the averaging time period according to the following equation:

$$Stpc\_avg(k) = Stpc\_avg(k) * num\_tpc\_avg(k)$$

where num_tpc may vary from slot to slot.

The system comprises circuitry that enables improvement of the determined noise estimate of the DPCH 102 by augmenting a calculated noise estimate of at least one of: received dedicated pilot bits and received common pilot bits (CPICH). The SNR of the DPCH 102 for a plurality of multipaths may be calculated by averaging a calculated SNR of each of the plurality of radio link sets. The system comprises circuitry that enables calculation of the SNR of the DPCH 102 for each of the plurality of radio link sets to determine a plurality of signal to noise ratios (SNRs). The system comprises circuitry that enables controlling of transmit circuitry based on the determined plurality of SNRs. The system comprises circuitry that enables the transmit circuitry if at least one of the plurality of SNRs is above a first channel threshold. The system comprises circuitry that disables the transmit circuitry if at least one of the plurality of SNRs is not above a first channel threshold.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
   for each of a plurality of radio links, calculating, using a processing unit, a signal to noise ratio (SNR) of a downlink dedicated physical channel (DPCH) based on a plurality of transmit power control (TPC) bits received via a plurality of multipaths over said DPCH,
   wherein said calculating said SNR comprises summing portions of said plurality of TPC bits that are received via said plurality of multipaths over said DPCH to generate an in-phase (I) component and a quadrature (Q) component; and
   calculating, using the processing unit an average SNR of said DPCH by averaging said calculated SNR of each of said plurality of radio links.

2. The method according to claim 1, further comprising controlling a transmit circuitry based on said calculated average SNR.

3. The method according to claim 1, further comprising disabling a transmit circuitry, if said calculated average SNR of said plurality of TPC bits is below a first channel threshold.

4. The method according to claim 1, further comprising enabling a transmit circuitry, if said calculated average SNR of said plurality of TPC bits is above a second channel threshold.

5. The method according to claim 1, wherein said calculating said SNR further comprises:
   summing said generated I component and said generated Q component; and
   squaring said summed said generated I component and said generated Q component to determine signal power of said DPCH.

6. The method according to claim 5, wherein said calculating said SNR further comprises calculating a norm of said squared said summed said generated I component and said generated Q component by dividing said squared said summed said generated I component and said generated Q component by a number of said plurality of TPC bits per slot of said DPCH to determine said signal power of said DPCH.

7. The method according to claim 6, wherein said calculating said SNR further comprises averaging said norm of said squared said summed said generated I component and said generated Q component over a time window.

8. The method according to claim 1, wherein said calculating said SNR further comprises subtracting said generated I component and said generated Q component to determine noise power of said DPCH.

9. The method according to claim 8, wherein said calculating said SNR further comprises:
   squaring said subtracted said generated I component and said generated Q component; and
   summing said squared said subtracted said generated I component and said generated Q component over a plurality of TPC symbols to determine said noise power of said DPCH.

10. The method according to claim 9, wherein said plurality of TPC symbols is half of said plurality of TPC bits per slot of said DPCH.

11. The method according to claim 9, wherein said calculating said SNR further comprises:
   calculating a norm of said summed said squared said subtracted said generated I component and said generated Q component by dividing said summed said squared said subtracted said generated I component and said generated Q component by a number of said plurality of TPC bits per slot of said DPCH; and
   averaging said norm of said summed said squared said subtracted said generated I component and said generated Q component over a time window to determine said noise power of said DPCH.

12. The method according to claim 1, further comprising enabling a transmit circuitry, if and only if at least one of said SNRs of said plurality of radio links is above a first channel threshold.

13. A system for signal processing, the system comprising:
   one or more circuits that are configured to:
      for each of a plurality of radio links, calculate a signal to noise ratio (SNR) of a downlink dedicated physical channel (DPCH) based on a plurality of transmit power control (TPC) bits received via a plurality of multipaths over said DPCH, wherein said calculating said SNR comprises summing portions of said plurality of TPC bits that are received via said plurality of multipaths over said DPCH to generate an in-phase (I) component and a quadrature (Q) component; and calculating an average SNR of said DPCH by averaging said calculated SNR of each of said plurality of radio links.

14. The system according to claim 13, wherein said one or more circuits are further configured to control a transmit circuitry based on said calculated average SNR.

15. The system according to claim 13, wherein said one or more circuits are further configured to disable a transmit circuitry, if said calculated average SNR of said plurality of TPC bits is below a first channel threshold.

16. The system according to claim 13, wherein said one or more circuits are further configured to enable a transmit circuitry, if said calculated average SNR of said plurality of TPC bits is above a second channel threshold.

17. The system according to claim 13, wherein said one or more circuits are configured to:

sum said generated I component and said generated Q component; and square said summed said generated I component and said generated Q component to determine signal power of said DPCH.

18. The system according to claim 17, wherein said one or more circuits are configured to calculate a norm of said squared said summed said generated I component and said generated Q component by dividing said squared said summed said generated I component and said generated Q component by a number of said plurality of TPC bits per slot of said DPCH to determine said signal power of said DPCH.

19. The system according to claim 18, wherein said one or more circuits are configured to average said norm of said squared said summed said generated I component and said generated Q component over a time window.

20. The system according to claim 13, wherein said one or more circuits are configured to subtract said generated I component and said generated Q component to determine noise power of said DPCH.

21. The system according to claim 20, wherein said one or more circuits are configured to:

square said subtracted said generated I component and said generated Q component; and sum said squared said subtracted said generated I component and said generated Q component over a plurality of TPC symbols to determine said noise power of said DPCH.

22. The system according to claim 21, wherein said plurality of TPC symbols is half of said plurality of TPC bits per slot of said DPCH.

23. The system according to claim 21, wherein said one or more circuits are configured to:

calculate a norm of said summed said squared said subtracted said generated I component and said generated Q component by dividing said summed said squared said subtracted said generated I component and said generated Q component by a number of said plurality of TPC bits per slot of said DPCH to determine said noise power of said DPCH; and average said norm of said summed said squared said subtracted said generated I component and said generated Q component over a time window.

24. The system according to claim 13, wherein said one or more circuits are configured to enable a transmit circuitry if and only if at least one of said SNRs of said plurality of radio links is above a first channel threshold.

* * * * *